United States Patent [19]

Ostrowski et al.

[11] Patent Number: 5,521,847
[45] Date of Patent: May 28, 1996

[54] SYSTEM AND METHOD FOR DETERMINING AIRFOIL CHARACTERISTICS FROM COORDINATE MEASURING MACHINE PROBE CENTER DATA

[75] Inventors: Michael C. Ostrowski, Glenville; Lowell W. Bauer, Niskayuna, both of N.Y.; Andrew J. Worsey, Brentwood, Tenn.

[73] Assignee: General Electric Company, Schenectady, N.Y.

[21] Appl. No.: 272,976

[22] Filed: Jul. 1, 1994

[51] Int. Cl.⁶ ............................................. G01B 5/20
[52] U.S. Cl. ..................... 364/559; 33/503; 33/504; 33/546
[58] Field of Search ........................ 356/375, 376, 356/2; 364/474.37, 559, 474.29; 33/503, 504, 545, 546, 549, 551, 555, 556

[56] References Cited

U.S. PATENT DOCUMENTS

| | | | |
|---|---|---|---|
| 2,906,179 | 9/1959 | Bower | 33/503 X |
| 3,250,012 | 5/1966 | Hilton et al. | 33/555 X |
| 3,400,463 | 9/1968 | Barringer | 33/546 |
| 3,434,218 | 3/1969 | Potter | 33/503 |
| 3,509,635 | 5/1970 | Meinke | 33/561 |
| 3,531,868 | 10/1970 | Stevenson | 33/503 |
| 5,196,900 | 3/1993 | Pettersen | 356/376 X |
| 5,208,763 | 5/1993 | Hong et al. | 364/559 X |
| 5,243,665 | 9/1993 | Maney et al. | 382/152 |
| 5,471,541 | 11/1995 | Burtnyk et al. | 356/376 X |

*Primary Examiner*—Edward R. Cosimano
*Attorney, Agent, or Firm*—David C. Goldman; Paul R. Webb, II

[57] ABSTRACT

The present invention discloses a system and method for determining airfoil characteristics from coordinate measuring machine probe center data. A coordinate measuring machine measures external coordinates along an airfoil and sends the coordinates to a computer. The computer sorts and orders the coordinates into a plurality of probe center points along a plurality of sections along the airfoil. The probe center points are triangulated to detect and eliminate errant points. Then the probe center points are correlated to a nominal part of the airfoil stored in the memory of the computer until a specified plane of interest is obtained. A discrete inset operation is performed on the correlated data for the plane of interest until a maximum thickness is obtained. The inset points are then joined to form an airfoil meanline, which is used to determine characteristics such as leading edge thickness, trailing edge thickness, and chord length.

30 Claims, 13 Drawing Sheets fig. 1 fig. 2 fig. 3 fig. 4 fig. 5 fig. 6 fig. 7 fig. 8 fig. 9 fig. 10 fig. 11 fig. 12

SYSTEM AND METHOD FOR DETERMINING AIRFOIL CHARACTERISTICS FROM COORDINATE MEASURING MACHINE PROBE CENTER DATA

BACKGROUND OF THE INVENTION

The present invention relates generally to coordinate measuring machines, and more particularly to using coordinate measuring machine probe center data to determine airfoil characteristics.

Airfoils are used typically in aircraft engine blades and vanes, and generally have highly sculptured complex surface geometries which must be manufactured to meet precise engineering characteristics. The tolerances on the characteristics are tightly specified in order to meet performance requirements. The outside shape of the airfoil can be determined by manually inspecting the airfoil with a hard gauge such as a guillotine gauge. However, the hard gauge is very subjective and the results vary from one user to another. Another approach in determining the outside shape of the airfoil is to analyze probe center points taken on a section-by-section basis from a coordinate measuring machine (CMM). The CMM approach is computationally intensive and is highly dependent upon accurate, ordered and well distributed probe touch points. Typically, manual methods such as graphically or textually deleting the offending points from the electronic file are used to eliminate errant CMM data and to order the points in a consistent orientation about the airfoil on a section-by-section basis. Planar touch point correction of the CMM probe touch points and subsequent airfoil characteristics are determined by using continuous geometry and curve-fitting approximation methods that make assumptions about the distribution of the CMM probe center data, nominal and actual airfoil shapes. As mentioned above, this method is computationally intensive and is highly dependent upon accurate, ordered and well distributed probe touch points, which is not very practical for a typical CMM.

SUMMARY OF THE INVENTION

Therefore, it is a primary objective of the present invention to provide a system and method for using CMM probe center data in conjunction with a nominal geometric model of the inspected airfoil part to accurately derive the engineering characteristics of the inspected part without using predetermined assumptions.

Another object of the present invention is to provide a system and method for deriving characteristics that are not computationally intensive and that account for the practical realities associated with CMM measurements such as out-of-order probe center points and probe contact at unexpected locations.

Still another object of the present invention is to accurately derive engineering characteristics of an inspected part to improve quality assurance with parts.

The present invention attains these objects by using unordered probe center data points taken from a CMM and ordering the points in a consistent direction about the airfoil on a section-by-section basis. The ordered probe center points are then corrected for surface touch point inaccuracies. Next, the surface touch points are corrected for planar inaccuracies. Discrete inset points are derived from the planar touch points, which are used to determine the airfoil shape characteristics. This approach is insensitive to errant probe center data about the body of the airfoil which may occur from premature contact between the CMM probe and the part or fixture. Furthermore, any sections which cannot be analyzed due to an insufficient amount of data are detected but do not affect the analysis of any other airfoil section.

Thus, in accordance with the present invention, there is provided a system for determining characteristics of a part having a complex surface geometry. A fixture holds the part while a coordinate measurement machine having a ball probe measures external coordinates along the part. The external coordinates are a set of unordered probe center points. A computer is operably connected to the coordinate measurement machine and has a model of a nominal part stored in memory. The computer includes an ordering means for ordering the probe center points about the part in a plurality of sections. An aligning means aligns the ordered probe center points for each section to a corresponding section of the nominal part. The aligned probe center points are then planar corrected to derive planar touch points and the characteristics of the part are derived from the planar touch points.

While the present invention will hereinafter be described in connection with a preferred embodiment and method of use, it will be understood that it is not intended to limit the invention to this embodiment. Instead, it is intended to cover all alternatives, modifications and equivalents as may be included within the spirit and scope of the present invention as defined by the appended claims.

DETAILED DESCRIPTION OF THE PRESENT INVENTION

Figure 1:
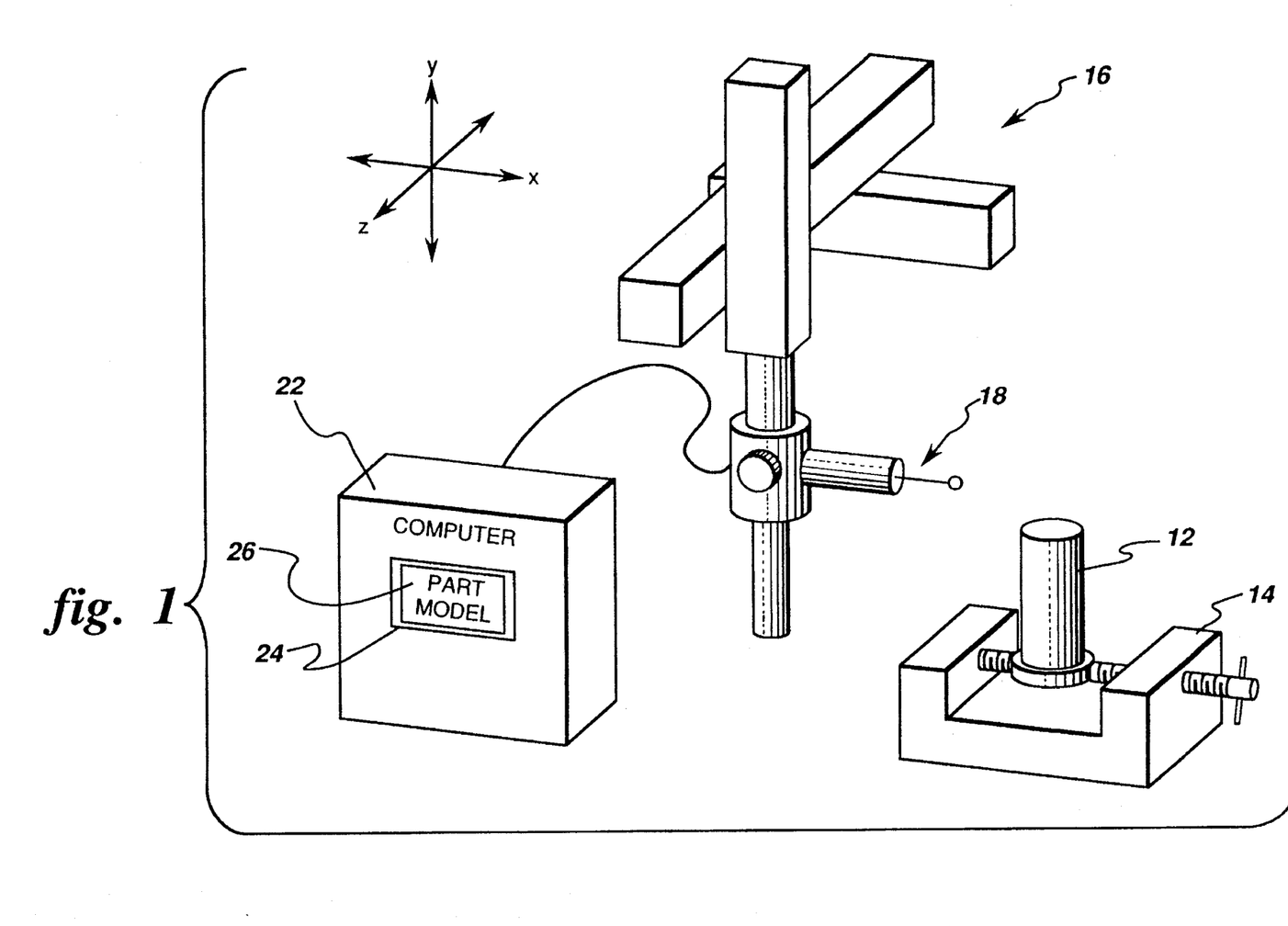
FIG. 1 is a representational view of the system used in the present invention.

FIG. 1 is a representational view of the system 10 used in the present invention. A part 12 is held in place by a fixture 14. For purposes of illustration, the part described in the present invention is an airfoil, but could be any part with a planar surface, a non-planar surface, or any shaped part having a complex or non-complex surface geometry. A programmable CMM 16 having a ball touch probe 18 measures external coordinates along the part 12 in the x-y-z direction. The ball touch probe is a well known device. A computer 22, preferably, a general purpose computer is operably connected to the CMM and programmed to control the movement of the ball touch probe 18, record measurements taken from the ball touch probe, and determine the part characteristics as described below in further detail. In addition, the computer contains a memory 24 that contains a geometric model of a nominal part 26 corresponding to the part 12.

In operation, the computer 22 moves the CMM 16 in three orthogonal directions x, y, and z about the part 12. The ball touch probe 18 generates a set of unordered probe center points for the part at a given coordinate. The unordered set of probe center points are sent to the computer for processing, which is described in further detail. The processed data is used to derive the engineering characteristics of the part in a manner described below in further detail.

Figure 2:
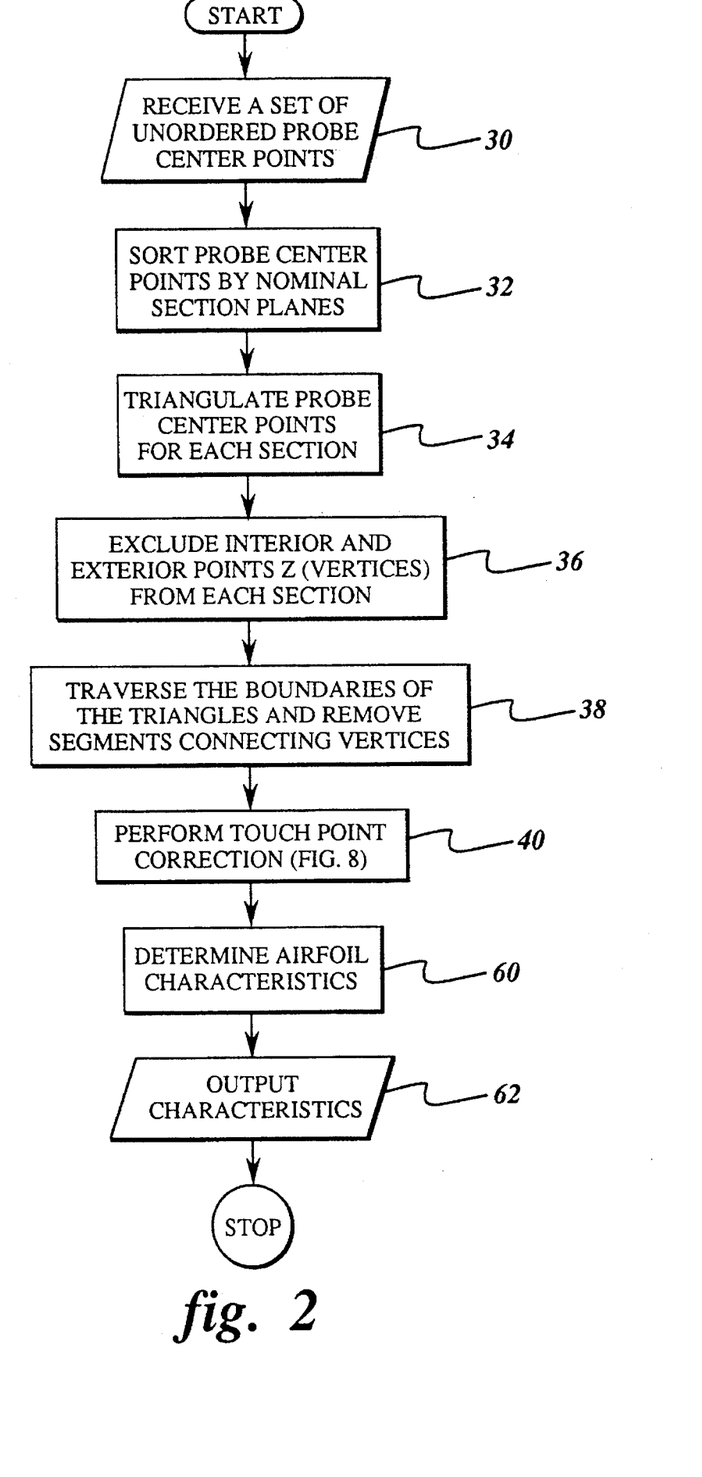
FIG. 2 is a flow-chart describing the method in the present invention to determine part characteristics.
Figure 3:
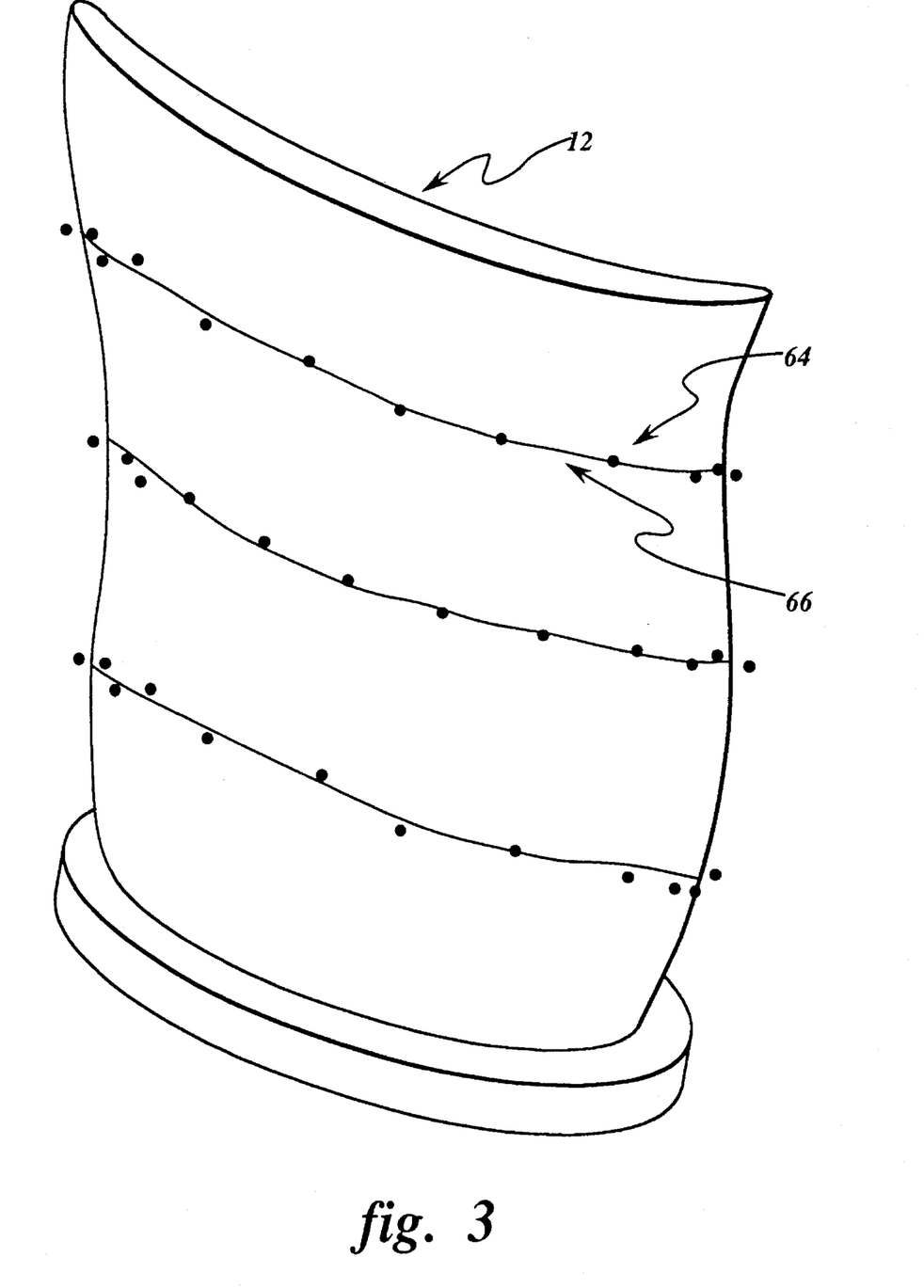
FIG. 3 is a perspective view of an airfoil.

The engineering characteristics are determined in accordance with the flow chart set forth in FIG. 2. In addition, FIGS. 3–13 provide graphical representations illustrating the results occurring at various steps in the flow chart of FIG. 2. The computer receives a set of probe center points at 30. FIG. 3 shows a perspective view of the airfoil part 12 with a plurality of probe center points 64. The probe center points are unordered, but are identified by nominal sections of interest 66. These points are assumed to be in the same reference frame as the nominal part 26 stored in the memory 24 (i.e., a datumed part). Along with the probe center points, the probe radius is recorded.

Figure 4:
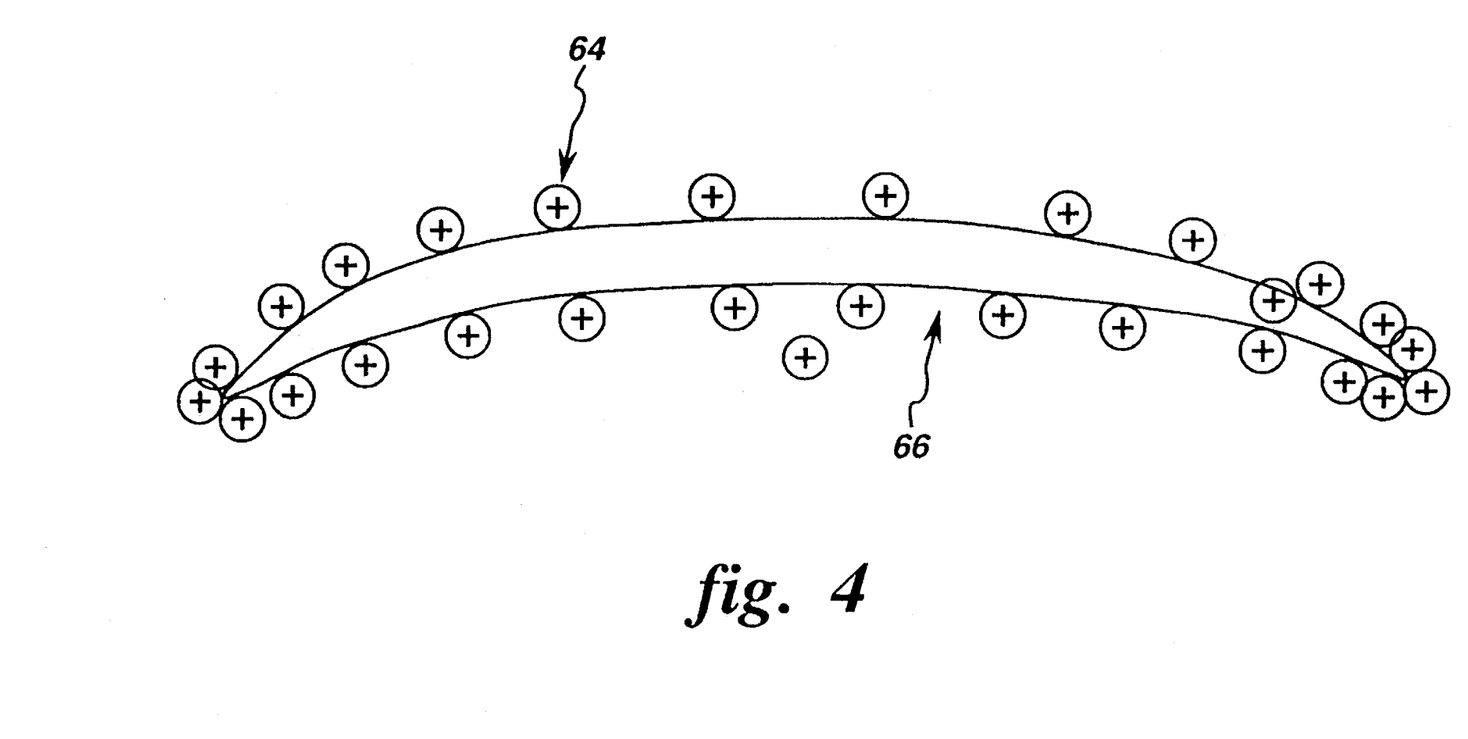
FIG. 4 shows a two-dimensional sectional view of the airfoil.
Figure 5:
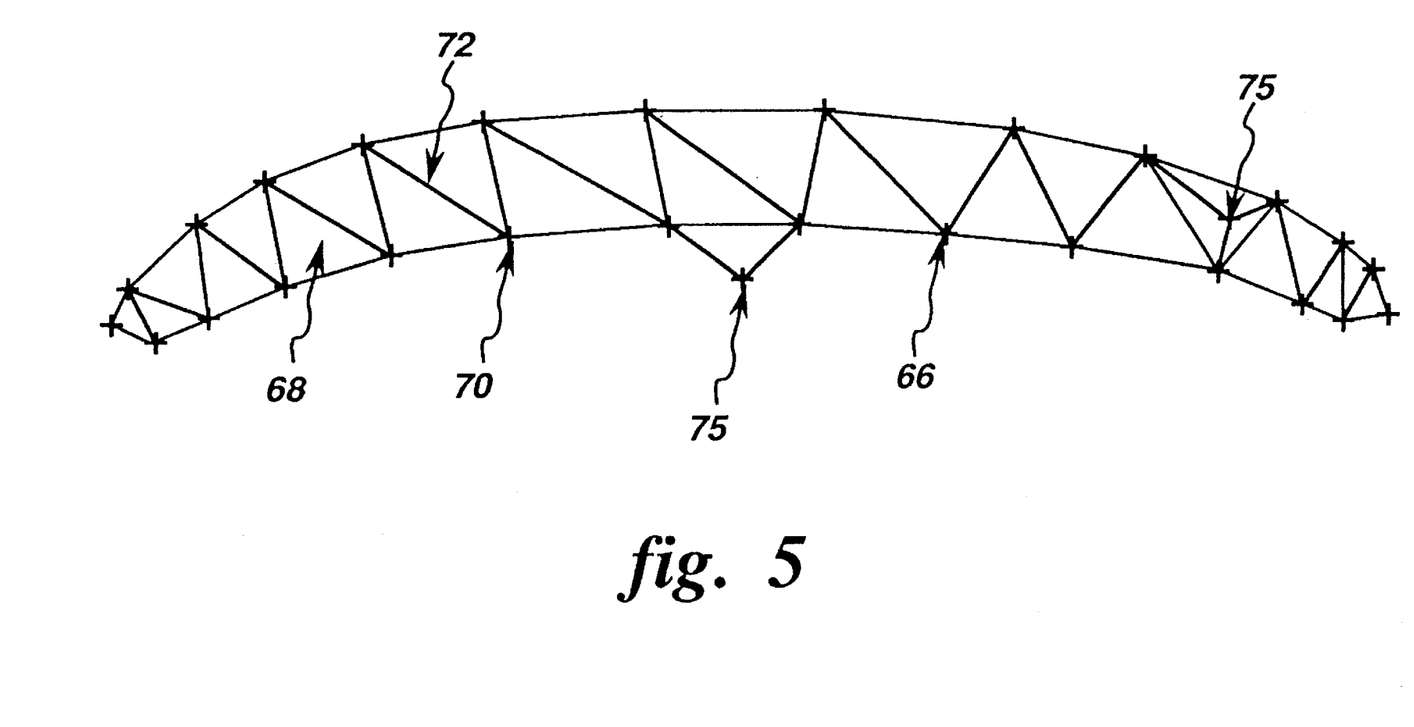
FIG. 5 shows a two-dimensional sectional view of the airfoil with triangulations.
Figure 6:
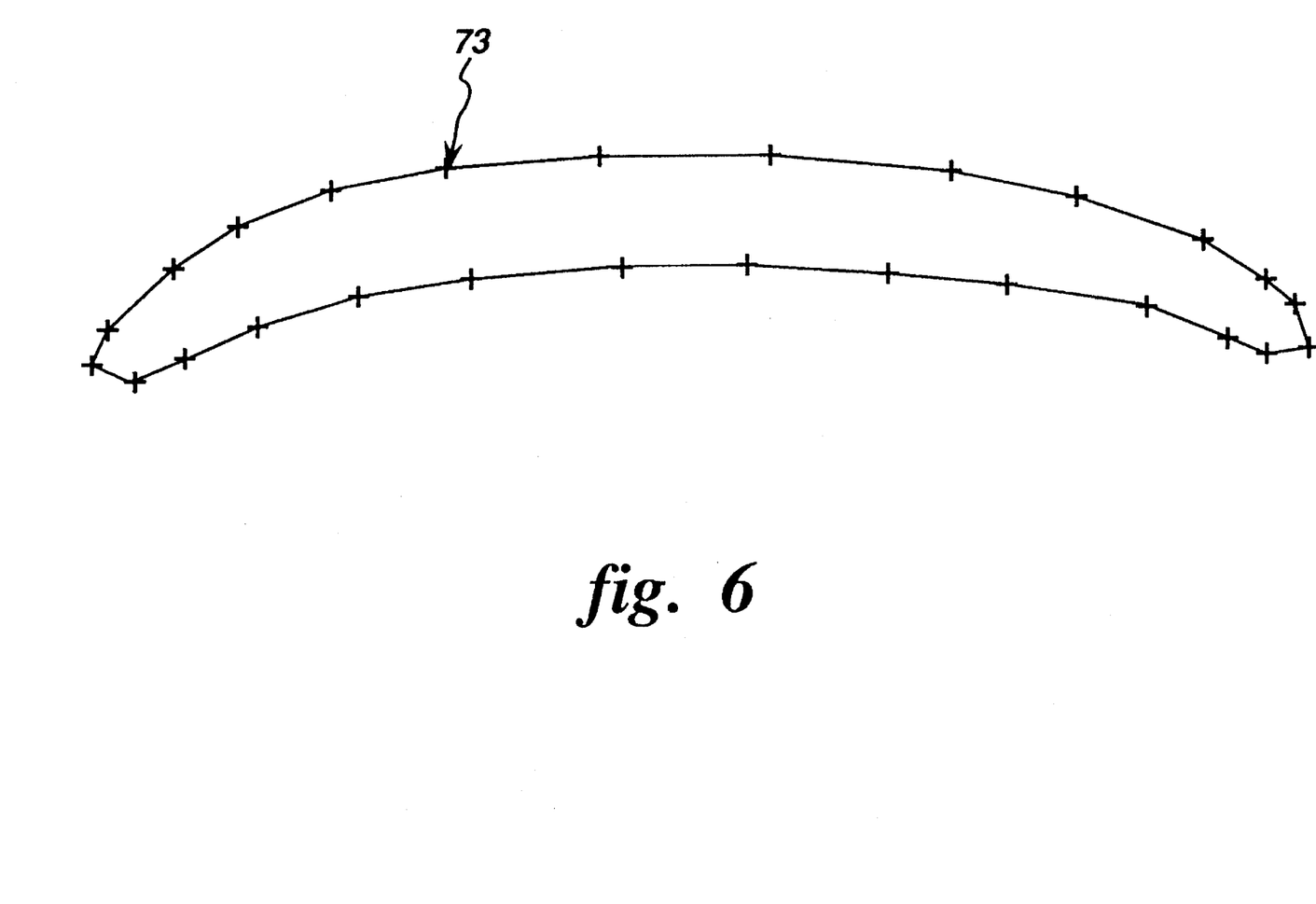
FIG. 6 shows a two-dimensional sectional view of the airfoil containing a set of ordered probe center points.

Next, the probe center points are sorted by nominal section planes at 32. FIG. 4 shows a two-dimensional view of a section 66 from the airfoil 12 with a plurality of probe center points from the ball touch probe 18 thereat. Each section 66 of the airfoil contains a plurality of probe center points and are processed in a section-by-section manner. At 34, the probe center points at each section are triangulated by using a triangulation method such as a Delaunay triangulation or the like. In the triangulation, the probe center points 64 are connected to form triangles 68 as shown in FIG. 5. Note that the triangulated section in FIG. 5 contains vertices 75 that are interior and exterior to the section 66, respectively. Interior and exterior vertices are considered to be errant CMM probe hits and are excluded at 36. Once all of the errant points have been excluded, the boundaries of the triangles are traversed in a counter-clockwise fashion at 38, removing segments 72 connecting the vertices 70. Removing the segments from the vertices 70 results in a set of ordered probe center points 73 as shown in FIG. 6.

Figure 7:
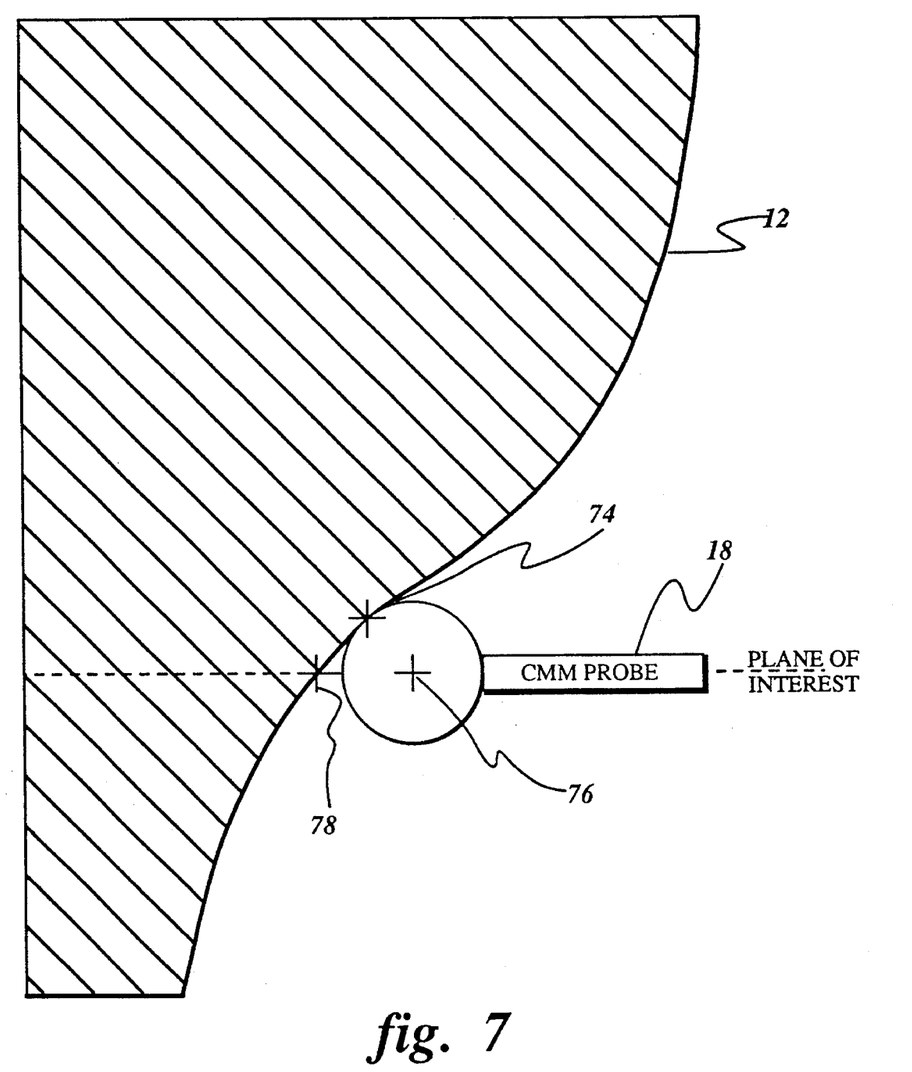
FIG. 7 shows a close up view of the airfoil with a CMM ball probe.

In order to account for inaccuracies associated with the ball touch probe 18 contacting the airfoil 12, the ordered probe center points are corrected and transformed into planar touch points on the actual airfoil surface at 40. FIG. 7 illustrates the reason why planar touch points are necessary. In particular, the ball touch probe 18 is shown contacting the airfoil at an actual touch point 74. However, only the probe center point 76 is received by the computer and not the actual touch point or the desired touch point 78. Thus, it is necessary to determine the actual touch point and the desired touch point for all of the ordered probe center points.

Figure 8:
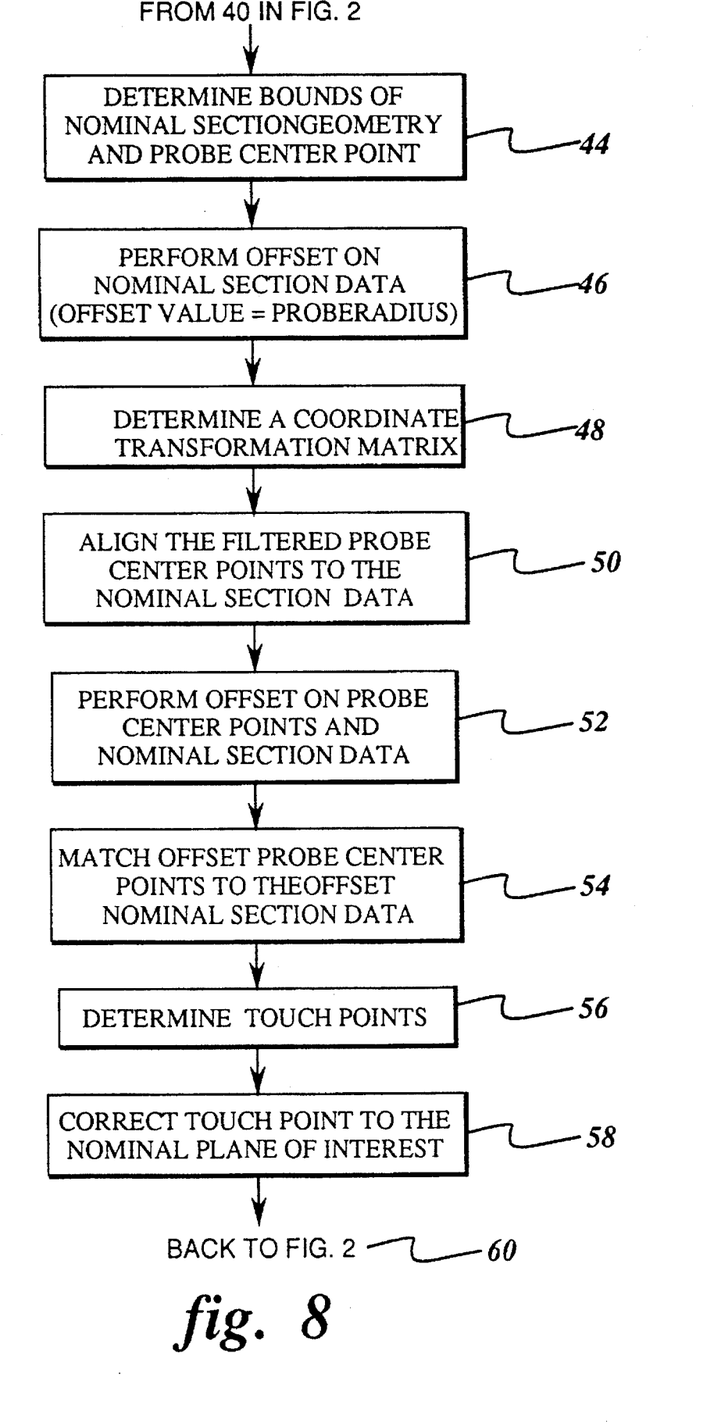
FIG. 8 is a flow-chart describing the touch point correction used in the present invention.
Figure 9:
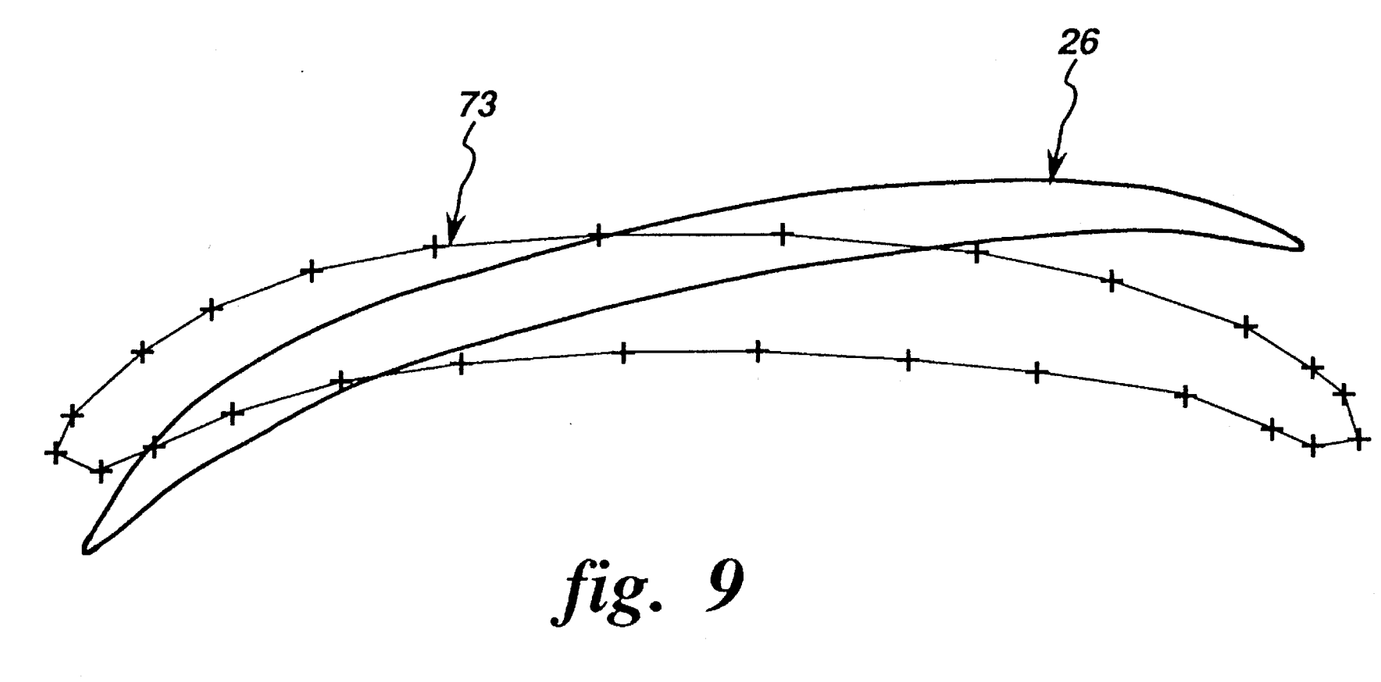
FIG. 9 shows a two-dimensional sectional view of the ordered probe center points and the nominal section geometry.

Touch point correction is performed using the ordered probe center points along with the nominal geometry for each section and is described in the flow-chart set forth in FIG. 8. At 44, the bounds of the nominal section geometry and the ordered probe center points are determined by finding the minimum and maximum x and y coordinate positions of all of the points. FIG. 9 shows a two-dimensional sectional view of the ordered probe center points 73 and the nominal section geometry 26. A discrete offset is performed at 46 on the nominal section data using an offset value equal to the probe radius. The offset is used to compensate for CMM measurements on part 12.

Figure 10:
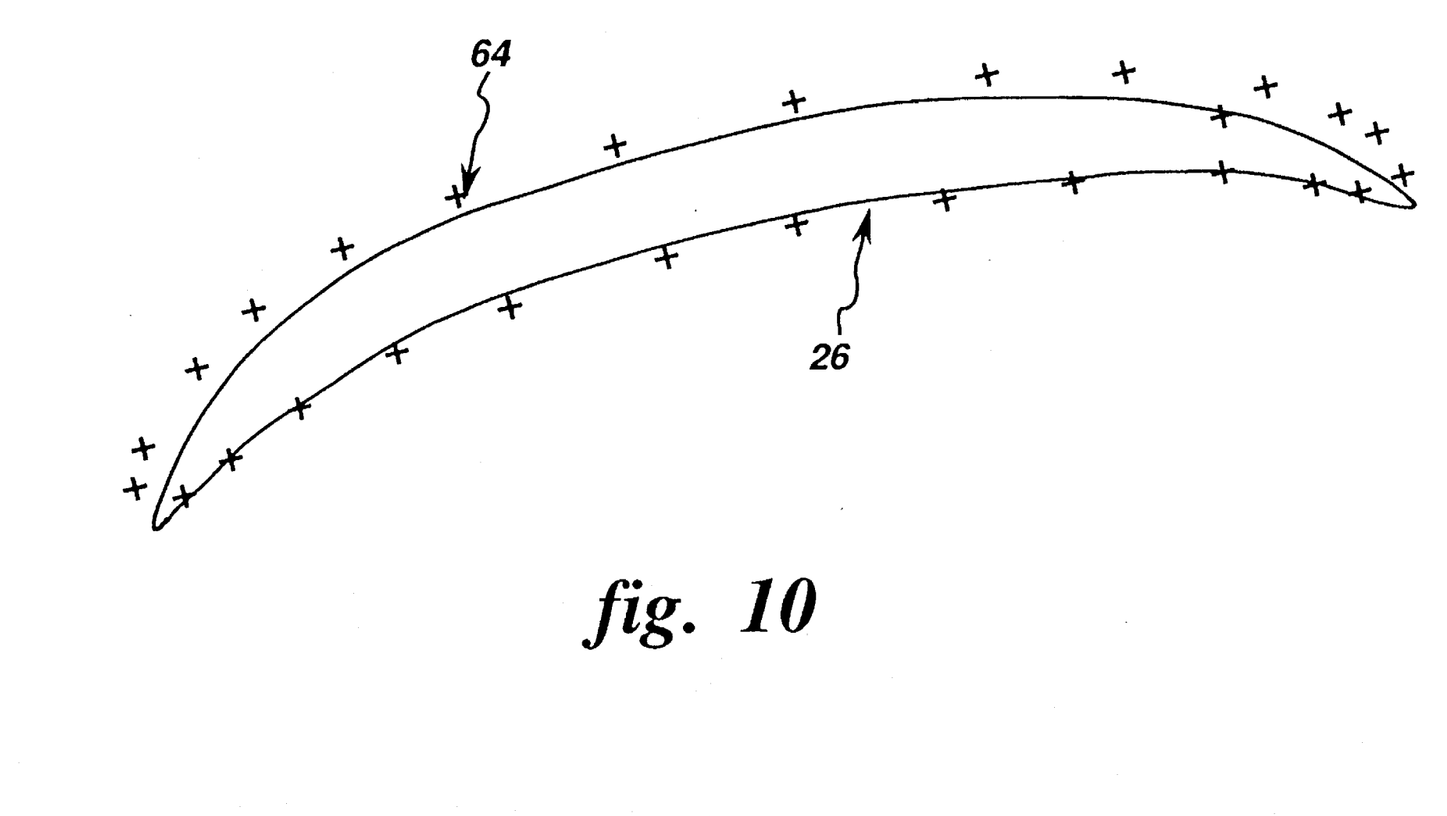
FIG. 10 shows a two-dimensional sectional view of the ordered probe center points aligned with the nominal section geometry.

Next, a coordinate transformation matrix is determined at 48 and used to align (i.e., translation, orientation and scaling) the ordered probe center points to the nominal section data at 50. The coordinate transformation is preferably a 4×4 matrix which is well known to skilled artisans. FIG. 10 shows a two-dimensional sectional view of the ordered probe center points 73 aligned with the nominal section geometry 26 after the coordinate transformation has been applied. Discrete offsets are then determined at 52 for the transformed probe center points and the nominal section data. In particular, a sufficiently large offset value is applied to the transformed probe center points and the nominal section points. This offset value must be small enough to avoid having the resulting shape collapse upon itself. The offset value used for the transformed probe center points is smaller than the offset value applied to the nominal section points by the probe radius. These offsets are used to improve the correlation between the nominal and inspection points.

Figure 11:
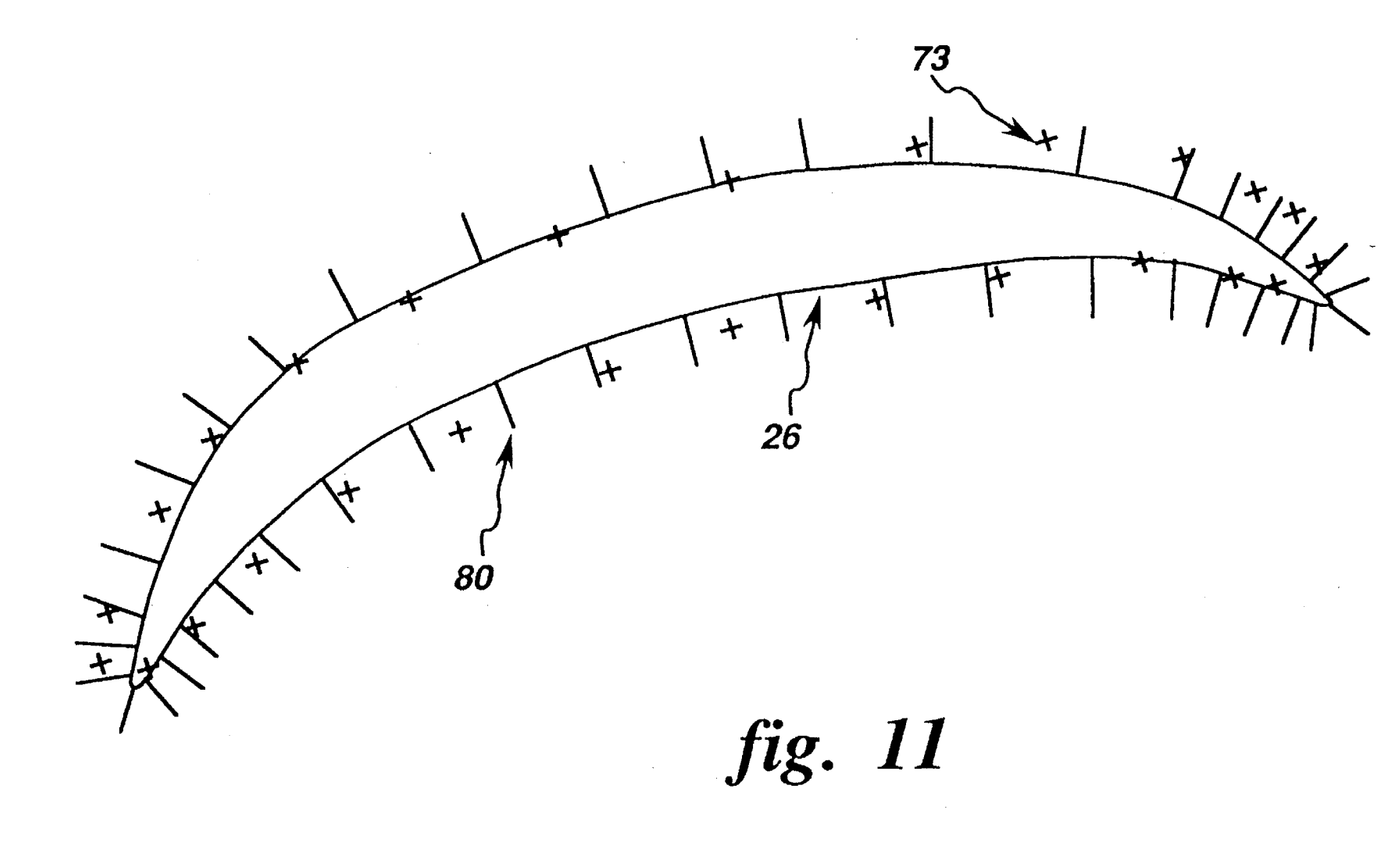
FIG. 11 shows a two-dimensional sectional view of the ordered probe center points aligned with the nominal section geometry and estimated surface normals.
Figure 12:
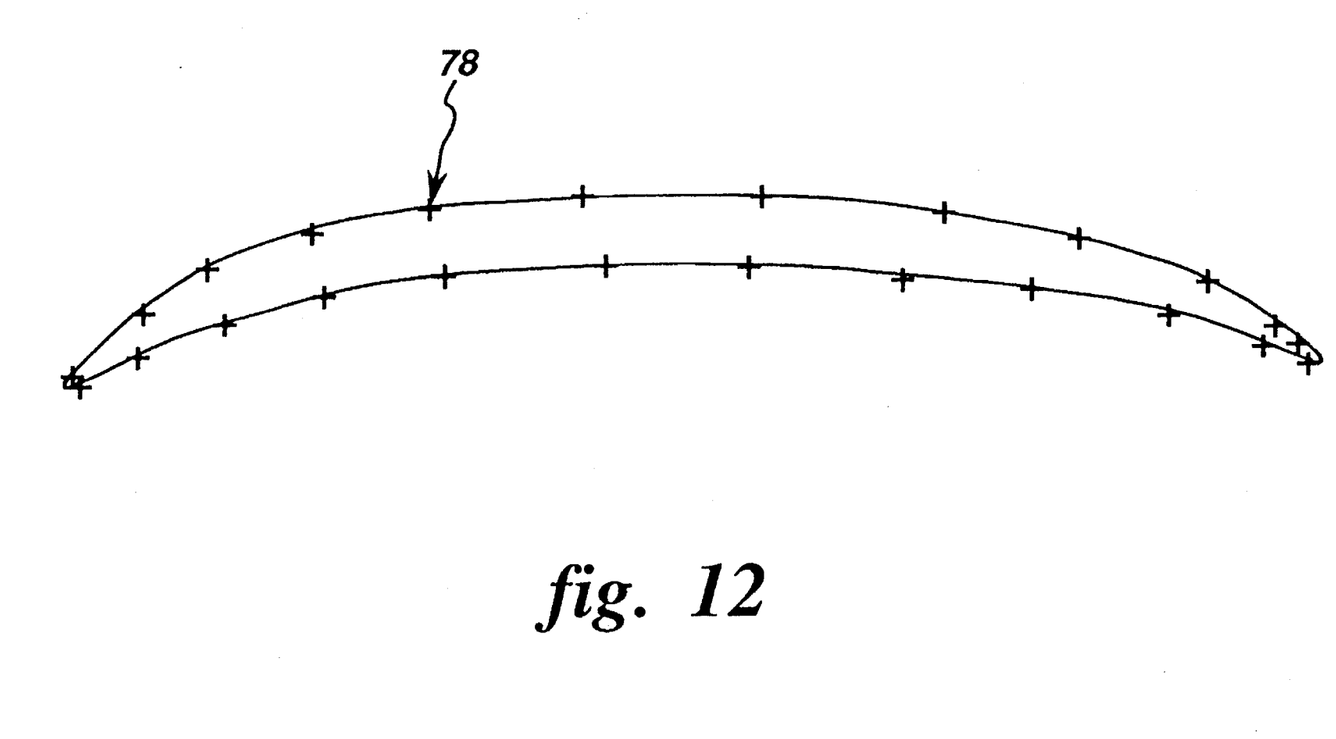
FIG. 12 shows a two-dimensional sectional view of the airfoil with planar touch points.

Each transformed probe center point is then matched at 54 to the nominal section data to estimate a surface normal 80 by a weighted average of the surface normals of the two closest nominal points (see FIG. 11). The original probe center points are then translated at 56 by one probe radius in the direction opposite to the estimated surface normals 80, to produce equivalent touch points. To correct the touch points to the desired touch points 78 or the nominal plane of interest, a tangent plane to the nominal surface at the touch point is determined at 58. After computing the tangent plane, a cross-spline vector in the tangent plane is computed. A cross-spline vector is a vector perpendicular to both the normal vector and the tangent vector at the point of interest. The cross-spline vector is used to approximate where the surface is, both above and below the section of interest. The intersection between the cross-spline vector and the nominal plane of interest is used to translate the touch points to the nominal plane of interest. FIG. 12 shows a two-dimensional sectional view of the airfoil 12 with the computed planar touch points 78.

Figure 13:
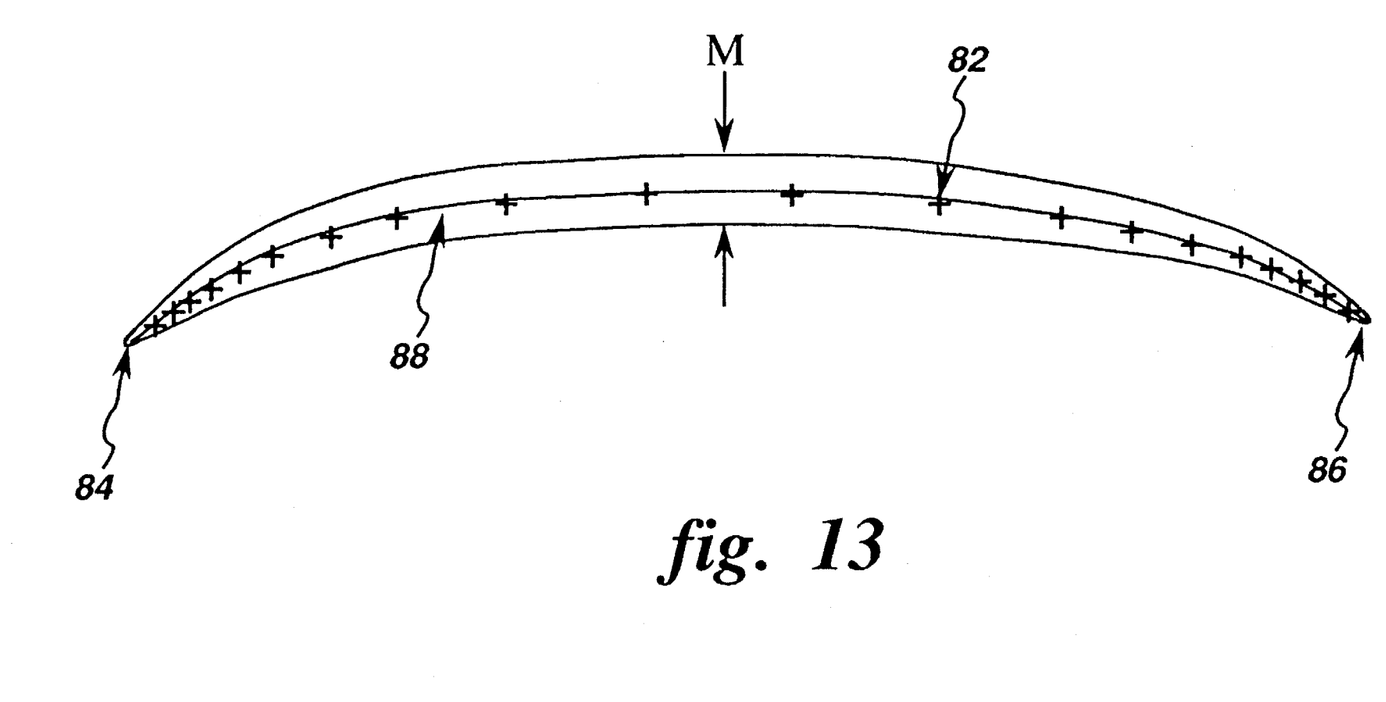
FIG. 13 shows a two-dimensional sectional view of the airfoil with a meanline derived from inset points.

After the planar touch points have been determined, the engineering characteristics of the airfoil are determined at 60. The engineering characteristics are derived by performing a rough characterization of the airfoil length and width. Then using a starting value for a discrete inset operation based on the rough characterization, the planar touch points are successively insetted with large values until an inset is no longer possible, yielding a maximum thickness M. FIG. 13 shows a two-dimensional sectional view of the derived section geometry having a maximum thickness M formed from inset points 82. In particular, at each inset operation, an inset curve will collapse on itself at opposing ends, in effect, pinching off the ends of the inset curve. These opposing points are points on a meanline 88. The discrete inset process continues from the original starting value using successively smaller inset values until the inset planar touch points no longer collapse to points at either ends 84 or 86 of the airfoil 12. All of the inset points 82 from each inset operation are joined to form an airfoil meanline 88. The intersection between the meanline and the connected planar touch points result in leading and trailing edge points. Airfoil characteristics such as leading edge thickness, trailing edge thickness, basic chord length, etc., are determined from the meanline, leading and trailing edge points, and the planar touch points using well known geometric constructions such as computing distances along the meanline, projecting perpendicular vectors about each side of the meanline, performing line-line intersection, and computing the distance between two points. After the characteristics have been determined, they are outputted at 62.

It is therefore apparent that there has been provided in accordance with the present invention, a system and method for determining airfoil characteristics from coordinate measuring machine probe center data that fully satisfy the aims and advantages and objectives hereinbefore set forth. The invention has been described with reference to several embodiments, however, it will be appreciated that variations and modifications can be effected by a person of ordinary skill in the art without departing from the scope of the invention.

The invention claimed is:

1. A system for determining characteristics of a part having a complex surface geometry, the system comprising:

a fixture for holding the part;

a coordinate measurement machine having a ball probe for measuring external coordinates along the part, the external coordinates being a set of unordered probe center points; and a computer, operably connected to the coordinate measurement machine, having a model of a nominal part stored in a memory, the computer including means for ordering the probe center points about the part in a plurality of sections, means for aligning the ordered probe center points for each section to a corresponding section of the nominal part, means for performing planar correction on the aligned probe center points to derive planar touch points, and means for determining the characteristics from the planar touch points.

2. A system according to claim 1, wherein the ordering means includes means for triangulating the probe center points at each section, means for excluding triangle vertices being interior and exterior to each of the triangulated sections and means for removing segments connecting vertices from the triangulations.

3. A system according to claim 1, wherein the aligning means includes means for determining boundaries of the ordered probe center points and the nominal part for each section, means for comparing the boundaries of the ordered probe center points and the nominal part, means for calculating a transformation matrix from the compared boundaries and means for applying the transformation matrix to the ordered probe center points.

4. A system according to claim 1, wherein the planar correction means includes means for estimating the surface normal for each ordered probe center point within a section and means for translating a probe radius in a direction opposite the estimated surface normal to produce a touch point.

5. A system according to claim 4, wherein the estimating means uses a weighted average of the surface normals of two closest nominal points.

6. A system according to claim 4, further comprising means for determining a tangent plane to the nominal surface at each touch point, means for computing the cross-spline vector in the tangent plane, means for ascertaining the intersection of the cross-spline vector and a nominal plane of interest, and means for translating the touch point to the nominal plane by the vector.

7. A system according to claim 1, wherein the characteristic determining means includes means for successively insetting planar touch points to compute a section having a maximum thickness, means for joining the inset planar touch points to derive a meanline, means for calculating leading and trailing edge points by intersecting the meanline with the planar touch points, and means for computing part characteristics from the meanline and the planar touch points.

8. A system according to claim 7, wherein the computed characteristics include leading edge thickness, trailing edge thickness, and chord length.

9. A system for determining characteristics of an airfoil, the system comprising:

a fixture for holding the airfoil;

a coordinate measurement machine having a ball probe for measuring external coordinates along the airfoil, the external coordinates being a set of unordered probe center points; and a computer, operably connected to the coordinate measurement machine, having a model of a nominal part of the airfoil stored in a memory, the computer including means for sorting the unordered probe center points into a plurality of sections along the airfoil, triangulating the unordered probe center points at each section, means for ordering the unordered probe center points for each of the plurality of sections, means for correlating the ordered probe center points for each section to a corresponding section of the nominal part, means for performing planar correction on the correlated probe center points to derive planar touch points, means for insetting the planar touch points to a meanline having leading and trailing edge points, and means for determining airfoil characteristics from the meanline.

10. A system according to claim 9, wherein the triangulating means excludes triangle vertices being interior and exterior to each of the triangulations.

11. A system according to claim 9, wherein the ordering means removes segments connecting vertices from the triangulations.

12. A system according to claim 9, wherein the correlating means includes means for determining boundaries of the ordered probe center points and the nominal part for each section, means for comparing the boundaries of the ordered probe center points and the nominal part, means for calculating a transformation matrix from the compared boundaries and means for applying the transformation matrix to the ordered probe center points.

13. A system according to claim 9, wherein the planar correction means includes means for estimating the surface normal for each ordered probe center point within a section and means for translating a probe radius in a direction opposite the estimated surface normal to produce a touch point.

14. A system according to claim 13, further comprising means for determining a tangent plane to the nominal surface at each touch point, means for computing the cross-spline vector in the tangent plane, means for ascertaining the intersection of the cross-spline vector and a nominal plane of interest, and means for translating the touch point to the nominal plane by the vector.

15. A system according to claim 9, wherein the computed characteristics include leading edge thickness, trailing edge thickness, and chord length.

16. A method for determining characteristics of a part having a complex surface geometry using a coordinate measurement machine having a ball probe for measuring external coordinates along the part, the external coordinates being a set of unordered probe center points, and a computer operably connected to the coordinate measurement machine having a model of a nominal part stored in a memory of the computer, the method comprising the steps of:

ordering the probe center points about the part in a plurality of sections;

aligning the ordered probe center points for each section to a corresponding section of the nominal part;

performing planar correction on the aligned probe center points to derive planar touch points; and determining part characteristics from the planar touch points.

17. A method according to claim 16, wherein the step of ordering includes triangulating the probe center points at each section, excluding triangle vertices being interior and exterior to each of the triangulated sections and removing segments connecting vertices from the triangulations.

18. A method according to claim 16, wherein the step of aligning includes determining boundaries of the ordered probe center points and the nominal part for each section, comparing the boundaries of the ordered probe center points and the nominal part, calculating a transformation matrix from the compared boundaries and applying the transformation matrix to the ordered probe center points.

19. A method according to claim 16, wherein the characteristic determining step includes successively insetting planar touch points producing a section having a maximum thickness, joining the inset planar touch points to derive a meanline, calculating leading and trailing edge points by intersecting the meanline with the planar touch points, and computing part characteristics from the meanline and the planar touch points.

20. A method according to claim 19, wherein the computed characteristics include leading edge thickness, trailing edge thickness, and chord length.

21. A method according to claim 16, wherein the step of planar correction includes estimating the surface normal for each ordered probe center point within a section and translating a probe radius in a direction opposite the estimated surface normal to produce a touch point.

22. A method according to claim 21, wherein the estimating step uses a weighted average of the surface normals of two closest nominal points.

23. A method according to claim 21, further comprising determining a tangent plane to the nominal surface at each touch point, computing the cross-spline vector in the tangent plane, ascertaining the intersection of the cross-spline vector and a nominal plane of interest, and translating the touch point to the nominal plane by the vector.

24. A method for determining characteristics of an airfoil using a coordinate measurement machine having a ball probe for measuring external coordinates along the airfoil, the external coordinates being a set of unordered probe center points, and a computer operably connected to the coordinate measurement machine having a model of a nominal part of the airfoil stored in a memory of the computer, the method comprising the steps of:

sorting the unordered probe center points into a plurality of sections along the airfoil;

triangulating the unordered probe center points at each section;

ordering the unordered probe center points for each of the plurality of sections;

correlating the ordered probe center points for each section to a corresponding section of the nominal part;

performing planar correction on the correlated probe center points to derive planar touch points;

insetting the planar touch points to a meanline;

determining airfoil characteristics from the meanline and the planar touch points.

25. A method according to claim 24, wherein the step of triangulating excludes triangle vertices being interior and exterior to each of the triangulations.

26. A method according to claim 24, wherein the step of ordering removes segments connecting vertices from the triangulations.

27. A method according to claim 24, wherein the step of correlating includes determining boundaries of the ordered probe center points and the nominal part for each section, comparing the boundaries of the ordered probe center points and the nominal part, calculating a transformation matrix from the compared boundaries and applying the transformation matrix to the ordered probe center points.

28. A method according to claim 24, wherein the computed characteristics include leading edge thickness, trailing edge thickness, and chord length.

29. A method according to claim 24, wherein the step of planar correction includes estimating the surface normal for each ordered probe center point within a section and translating a probe radius in a direction opposite the estimated surface normal to produce a touch point.

30. A method according to claim 29, further comprising the steps:of determining a tangent plane to the nominal surface at each touch point, computing the cross-spline vector in the tangent plane, ascertaining the intersection of the cross-spline vector and a nominal plane of interest, and translating the touch point to the nominal plane by the vector.

* * * * *